(12) United States Patent
Ketelaer et al.

(10) Patent No.: US 10,821,568 B2
(45) Date of Patent: Nov. 3, 2020

(54) METHOD AND DEVICE FOR DETERMINING A VIBRATION AMPLITUDE OF A TOOL

(71) Applicant: SAUER GmbH, Stipshausen (DE)

(72) Inventors: Jens Ketelaer, Wiesbaden (DE); Fabian Franzmann, Idar-Oberstein (DE)

(73) Assignee: SAUER GmbH, Stipshausen (DE)

( * ) Notice: Subject to any disclaimer, the term of this patent is extended or adjusted under 35 U.S.C. 154(b) by 32 days.

(21) Appl. No.: 15/758,883

(22) PCT Filed: Sep. 9, 2016

(86) PCT No.: PCT/EP2016/071357
§ 371 (c)(1),
(2) Date: Mar. 9, 2018

(87) PCT Pub. No.: WO2017/042365
PCT Pub. Date: Mar. 16, 2017

(65) Prior Publication Data
US 2018/0281142 A1    Oct. 4, 2018

(30) Foreign Application Priority Data

Sep. 9, 2015 (DE) .................. 10 2015 217 200

(51) Int. Cl.
*B23Q 17/12* (2006.01)
*G01H 9/00* (2006.01)
*B23Q 17/24* (2006.01)

(52) U.S. Cl.
CPC ......... *B23Q 17/12* (2013.01); *B23Q 17/2457* (2013.01); *B23Q 17/2485* (2013.01); *G01H 9/00* (2013.01)

(58) Field of Classification Search
CPC ............... B23Q 17/12; B23Q 17/2457; B23Q 17/2485; G01H 9/00
(Continued)

(56) References Cited

U.S. PATENT DOCUMENTS 4,502,823 A    3/1985 Wronski et al.
4,656,868 A *  4/1987 Azuma ............. G05B 19/4065
                                                340/680
(Continued)

FOREIGN PATENT DOCUMENTS

DE    10111974 A1    10/2001
EP    1431729 A1     6/2004
(Continued)

OTHER PUBLICATIONS

Nov. 22, 2016 Written Opinion issued in International Patent Application No. PCT/EP2016/071357.
(Continued)

*Primary Examiner* — Stephen D Meier
*Assistant Examiner* — Rose M Miller
(74) *Attorney, Agent, or Firm* — Oliff PLC

(57) ABSTRACT

A method for determining a vibration amplitude of a tool, includes the steps of: generating a light beam of a light barrier with a transmitter for generating the light beam and a receiver for detecting a light intensity of the light beam; generating a receiver signal on the basis of a light intensity of the light beam that is detected by the receiver of the light barrier; positioning a tool tip of the tool in the light beam; causing the tool to vibrate; determining the vibration amplitude of the tool from a modulation of the receiver signal brought about by the vibration of the tool.

22 Claims, 4 Drawing Sheets

(58) Field of Classification Search
USPC .................................................. 73/655, 643
See application file for complete search history.

(56) References Cited

U.S. PATENT DOCUMENTS

| | | | | |
|---|---|---|---|---|
| 4,817,003 | A | * | 3/1989 | Nagase ................ B24B 41/042 700/164 |
| 4,918,427 | A | * | 4/1990 | Thomas ................ G08B 21/187 340/680 |
| 5,218,893 | A | | 6/1993 | Shikata |
| 5,698,120 | A | | 12/1997 | Kurosawa et al. |
| 6,470,753 | B2 | | 10/2002 | Maruyama |
| 7,065,469 | B2 | * | 6/2006 | Samata ................ G01M 15/12 702/183 |
| 7,217,071 | B2 | | 5/2007 | Bayha et al. |
| 7,302,852 | B2 | * | 12/2007 | Chien ...................... G01H 9/00 73/643 |
| 8,240,396 | B2 | | 8/2012 | Sauer |
| 2001/0032514 | A1 | | 10/2001 | Maruyama |
| 2006/0251480 | A1 | | 11/2006 | Mann et al. |
| 2007/0036624 | A1 | | 2/2007 | Bayha et al. |
| 2008/0041604 | A1 | | 2/2008 | Sauer |
| 2008/0072722 | A1 | | 3/2008 | Tanki et al. |
| 2011/0209546 | A1 | | 9/2011 | Seuthe |

FOREIGN PATENT DOCUMENTS

| | | | |
|---|---|---|---|
| EP | 1745884 A1 | | 1/2007 |
| EP | 1763416 A1 | | 3/2007 |
| GB | 1510299 A | * | 5/1978 ......... G05B 19/4163 |
| JP | S54-30880 A | | 3/1979 |
| JP | S58-56094 B2 | | 12/1983 |
| JP | 2007-030158 A | | 2/2007 |
| JP | 2008-93784 A | | 4/2008 |
| JP | 2008-213073 A | | 9/2008 |
| JP | 2009-60665 A | | 3/2009 |
| JP | 5308599 B1 | | 10/2013 |
| JP | 62-88555 B2 | | 3/2018 |
| SU | 679789 A1 | | 8/1979 |
| WO | 2004/056528 A1 | | 7/2004 |
| WO | 2006/002675 A1 | | 1/2006 |

OTHER PUBLICATIONS

Feb. 27, 2020 Office Action issued in Korean Patent Application No. 9-5-2020-015147309.
Jun. 2, 2016 German Office Action issued in Patent Application No. 102015217200.7.
Nov. 22, 2016 International Search Report issued in International Patent Application No. PCT/EP2016/071357.
Mar. 4, 2020 Office Action issued in Chinese Patent Application No. 201680052571.7.
Jul. 3, 2019 Office Action issued in Japanese Patent Application No. 2018-512172.
Jul. 22, 2019 Office Action issued in Korean Patent Application No. 10-2018-7009849.
Apr. 8, 2019 Office Action issued in Russian Patent Application No. 2018112241.
Aug. 20, 2019 Office Action issued in Russian Patent Application No. 2018112241.

* cited by examiner

METHOD AND DEVICE FOR DETERMINING A VIBRATION AMPLITUDE OF A TOOL

The present invention relates to a method and a device for determining a vibration amplitude of a tool.

BACKGROUND OF THE INVENTION

The prior art is familiar with machine tools, in which an ultrasonic vibration of the tool can be superimposed to the rotational movement of the tool when a workpiece is machined by a tool.

EP 1 763 416 B1 describes in this connection a tool comprising a tool holder which, at a first end, has a tool holder support for adaptation to a rotary spindle nose and, at a second end opposite the first end, has a tool support, and comprising a tool head that can be inserted in the tool support, wherein the tool holder includes a vibration motor.

In order to set the tool in ultrasonic vibration, e.g. a piezo drive can be used, wherein an electric voltage causes a change in the thickness of the piezo disks. For certain frequencies this leads to a stationary wave in the tool holder (resonant excitation).

It should be noted that the resonance frequencies as well as the vibration amplitudes in resonance are dependent on the properties of the employed tool, such as the geometry or material thereof, and therefore the tool holder cannot be calibrated to a certain vibration amplitude ex factory.

EP 1 431 729 A1 describes an apparatus for the measurement of an amplitude of a freely vibrating capillary of a wire bonder for wiring semiconductor chips. Here, the capillary is caused to vibrate by means of an ultrasonic generator. In order to measure the amplitude itself, the shading of a light beam by the vibrating tip of the capillary is detected by means of a light receiver.

In the method described in EP 1 431 729 A1, the light beam can be interrupted by a complete shading of the light beam by the tip of the capillary. Since a statement on the vibration extent of the capillary can only be made on the basis of the shading degree, no statement can be made if there is the possibility of a complete shading since the light receiver is no longer able to detect a signal from the light beam. Therefore, there is a loss of the measurement signal, which, in turn, results in an inadequate measurement of the capillary vibration.

Furthermore, the method described in EP 1 431 729 A1 is limited to rotationally symmetric tools as pointed out by the example of the capillary of the wire bonder. However, since in the majority of cases the tools have asymmetries which protrude into the light beam and thus have a negative effect on the measurement of the vibration amplitude, this method is less suitable for such tools.

SUMMARY OF THE INVENTION

An object of the present invention is therefore to provide a method and a device by means of which the vibration amplitude of a vibrating tool can be measured.

This object is achieved by a method according to claim 1 and a device according to claim 11. The dependent claims relate to advantageous embodiments of the method according to the invention and the device according to the invention.

The method according to the invention for determining a vibration amplitude of a tool includes the steps: generating a light beam of a light barrier with a transmitter for producing the light beam and a receiver for detecting a light intensity of the light beam; generating a receiver signal on the basis of a light intensity of the light beam that is detected by the receiver of the light barrier; positioning a tool tip of the tool in the light beam; causing the tool to vibrate; determining the vibration amplitude of the tool from a receiver signal modulation brought about by the vibration of the tool.

This renders possible a tool-specific measurement of the actual vibration amplitude of a tool vibration e.g. in the ultrasonic frequency range in the machine tool itself. Here, a conventional tool measurement laser which is often already available in the machine tool, can be used as a light barrier. Therefore, the method according to the invention can be carried out in a cost-effective way without design modifications on the machine tool since it can be carried out with the available equipment of the machine tool without any additional installations in the interior of the machine. In addition, the vibration amplitude is measured by means of the light barrier in a contact-free manner in such a way that the tool cannot be damaged.

The method is preferably supplemented by the step of: setting the tool in a rotation about an axis perpendicular to the light beam, in particular during the measurement of the vibration amplitude and/or during the excitation of the vibration of the tool when the tool is disposed in the light beam.

In particular, the method preferably comprises receiving the tool or a tool holder holding the tool in a work spindle of the machine tool and driving a rotation of the tool by means of the work spindle, in particular during the step of determining the vibration amplitude of the tool from a modulation and/or change in the receiver signal, effected by the vibration of the tool, when the tool is positioned in the light beam.

The advantage in particular is that due to the rotation, e.g. driven with the work spindle of the machine tool, even tools with non-rotationally symmetric design appear to be a rotationally symmetric tool in a view perpendicular to the rotational axis. This, in turn, can be particularly advantageous for the amplitude measurement of the vibration of the tool since as a result the side of the tool that faces away from a spindle driving the tool forms at least one annular area or circular ring about the rotational axis of the tool. This area or ring can, in turn, be used for shading the light beam, which has turned out to be difficult in a non-rotationally symmetric tool without rotation.

Furthermore, the method can advantageously be developed in that the tool has at least one cutting edge (e.g. a milling blade of a milling cutter), which protrudes from the rest of the tool, e.g. in the direction of the vibration of the tool.

The advantage is that the tool geometry can be designed as desired in the direction of the vibration since possible asymmetries can be compensated again by the rotation of the tool.

In addition, the method can advantageously be developed so that the cutting blade of the tool additionally protrudes from the rest of the tool perpendicularly to the direction of the vibration of the tool.

The advantage here as well is that the tool geometry, in particular in the case of a tool geometry that is not rotationally symmetric or is not continuously rotationally symmetric, now no longer has any significant influence on the measurement assembly and/or on the reliability of the measurement of the vibration amplitude of the tool since the setting of the tool in rotation can here also compensate for possible asymmetries.

The additional advantage is that the vibration amplitude can be measured directly in the clamping of the tool or tool holder, which is also used for the subsequent processing of workpieces, on the work spindle of the machine tool, and if applicable, directly before the workpiece is processed.

Before the tool is caused to vibrate, the position of the tool tip in the light beam is preferably varied in such a way that a signal intensity of the receiver signal changes depending on the position of the tool tip.

The advantage is that neither the functionality nor the accuracy of the method is influenced by the geometry or the material of the tool since only the degree of shading of the light beam by the tool is decisive for the amplitude measurement.

The position of the tool tip is preferably varied in a region within the light beam stepwise along a direction perpendicular to the light beam, and at every step a corresponding signal intensity of the receiver signal is associated with the position of the tool tip.

In this way, the system is calibrated for an absolute amplitude measurement. In the calibration, a functional interrelationship is determined between the position of the tool tip and the signal intensity of the receiver signal so as to be able to determine the associated position of the tool tip from a measured signal intensity of the receiver signal at a later date.

The vibration amplitude of the tool is preferably determined from a difference of the maximum signal intensity and the minimum signal intensity of the receiver signal.

A first position of the tool tip can be determined from the maximum signal intensity and a second position of the tool tip can be determined from the minimum signal intensity for a vibrating tool after the calibration has taken place. The difference between these two positions supplies the amplitude of the tool vibration.

The direction perpendicular to the light beam preferably corresponds to a direction of a tool axis.

In this way, the vibration amplitude can be determined for a tool vibrating in an axial direction.

Alternatively, the direction perpendicular to the light beam preferably corresponds to a direction perpendicular to a tool axis.

In this way it is possible to determine the vibration amplitude for the tool which vibrates in a direction perpendicular to the tool axis. The method according to the invention thus renders possible a characterization of the tool vibration in several directions.

The receiver signal is preferably an analogous voltage signal which is generated by the receiver and is proportional to the light intensity detected by the receiver.

The advantage is that due to the linear correlation between light intensity and voltage the necessary calculations can be carried out in an easy and fast way.

The tool is preferably caused to vibrate in such a way that the tool tip vibrates within the light beam.

For the purpose of the measurement of the vibration amplitude, the vibrating tool tip is e.g. positioned in the light barrier in such a way that the tool tip is approximately equidistant from the transmitter and the receiver and is approximately in the center of the light beam diameter. The light beam diameter is thus chosen to be sufficiently wide so that the tool tip vibrates fully within the light beam. In this way, the modulation of the receiver signal directly shows the tool vibration.

The method according to the invention preferably includes the further steps of: generating a sensor signal from the vibration of the tool arranged in a tool holder by a sensor apparatus arranged in the tool holder; determining a vibration frequency of the vibration of the tool from the sensor signal depending on the vibration amplitude of the tool; determining the vibration amplitude of the tool from the sensor signal.

The advantage is that after calibrating a certain tool by means of the light barrier, the light barrier is no longer required for the amplitude measurement and can be removed since the vibration amplitude of the vibrating tool can be determined directly from the sensor signal.

The vibration frequency of the vibration of the tool is preferably varied stepwise and at every step a corresponding vibration amplitude of the tool is associated with the vibration frequency.

In other words, a two-step calibration is carried out in such a way that a functional interrelationship between the position of the tool tip and the signal intensity of the receiver signal is initially determined in such a way that the vibration amplitude can be inferred from the minimum value and the maximum value of the receiver signal for a vibrating tool. Then, a functional interrelationship between the vibration amplitude and the vibration frequency is determined in such a way that the vibration amplitude can be inferred from a measured vibration frequency for the vibrating tool.

The device according to the invention for determining a vibration amplitude of a tool comprises: a light barrier having a transmitter for generating a light beam and a receiver for detecting a light intensity of the light beam and for generating a receiver signal on the basis of the detected light intensity; an apparatus for positioning a tool tip of the tool in the light beam; an apparatus for causing the tool to vibrate, and an apparatus for determining the vibration amplitude of the tool from a modulation of the receiver signal that is effected by the vibration of the tool.

This renders possible a tool-specific measurement of the actual vibration amplitude of a tool vibration e.g. in the ultrasonic frequency range in the machine tool itself. A conventional tool measurement laser, which is often already present in the machine tool, can be used as the light barrier. Therefore, the device according to the invention can be set up in a cost-effective manner without design modifications to the machine tool with the already existing equipment of the machine tool without additional installations in the machine interior. In addition, the vibration amplitude is measured by means of the light barrier in contact-free fashion in such a way that the tool cannot be damaged.

The apparatus for positioning the tool tip is preferably designed to vary the position of the tool tip in the light beam in such a way that a signal intensity of the receiver signal changes depending on the position of the tool tip.

The advantage is that neither the functionality nor the accuracy of the device is influenced by the geometry or the material of the tool since only the degree of the shading of the light beam by the tool is decisive for the amplitude measurement.

The device preferably includes an apparatus for assigning the signal intensity of the receiver signal to the position of the tool tip, the apparatus for positioning the tool tip being configured to vary the position of the tool tip in a region within the light beam stepwise in a direction perpendicular to the light beam, and the apparatus for assigning the signal intensity of the receiver signal to the position of the tool tip is configured to assign at every step a corresponding signal intensity of the receiver signal to the position of the tool tip.

In this way, the system is calibrated for an absolute amplitude measurement with the device according to the invention. In the calibration, a functional interrelationship is determined between the position of the tool tip and the signal intensity of the receiver signal in such a way that the associated position of the tool tip can be determined from a measured signal intensity of the receiver signal at a later date.

The apparatus for determining the vibration amplitude of the tool is preferably configured to determine the vibration amplitude of the tool from a difference of the maximum signal intensity and the minimum signal intensity of the receiver signal.

After the calibration, a first position of the tool tip can be determined from the maximum signal intensity and a second position of the tool tip can be determined from the minimum signal intensity with the device for a vibrating tool. The difference between these two positions supplies the amplitude of the tool vibration.

The direction perpendicular to the light beam preferably corresponds to a direction of a tool axis.

In this way, the vibration amplitude can be determined for a tool vibrating in an axial direction.

Alternatively, the direction perpendicular to the light beam preferably corresponds to a direction perpendicular to a tool axis.

In this way, the vibration amplitude can be determined for the tool which vibrates in a direction perpendicular to the tool axis. The device according to the invention thus renders possible a characterization of the tool vibration in several directions.

The receiver of the light barrier is preferably configured to produce the receiver signal as an analogous voltage signal proportional to the light intensity detected by the receiver.

The advantage is that the necessary calculations can be carried out easily and rapidly on account of the linear correlation between light intensity and voltage.

The apparatus for causing the tool to vibrate is preferably configured to cause the tool to vibrate in such a way that the tool tip vibrates within the light beam.

For the purpose of measuring the vibration amplitude, the vibrating tool tip is e.g. positioned in the light barrier in such a way that the tool tip is approximately equidistant from the transmitter and the receiver and is approximately in the center of the light beam diameter. The light beam diameter is selected to be sufficiently wide, such that the tool tip vibrates fully within the light beam. In this way the modulation of the receiver signal directly shows the tool vibration.

The device according to the invention preferably also has: a tool holder for receiving the tool; a sensor apparatus arranged in the tool holder for generating a sensor signal from the vibration of the tool; an apparatus for determining a vibration frequency of the vibration of the tool from the sensor signal depending on the vibration amplitude of the tool; and an apparatus for determining the vibration amplitude of the tool from the sensor signal.

The advantage is that when a calibration for a certain tool has taken place by means of the light barrier, the light barrier is no longer necessary for the amplitude measurement and can be removed since the vibration amplitude of the vibrating tool can be determined directly from the sensor signal.

The device preferably also includes: an apparatus for the stepwise variation of the vibration frequency of the vibration of the tool and an apparatus for assigning the vibration amplitude of the tool to the vibration frequency, the apparatus for assigning the vibration amplitude of the tool to the vibration frequency being configured to assign at every step a corresponding vibration amplitude of the tool to the vibration frequency.

In other words, the device according to the invention renders possible a two-step calibration in such a way that a functional interrelationship is initially determined between the position of the tool tip and the signal intensity of the receiver signal in such a way that the vibration amplitude for a vibrating tool can be inferred from the minimum value and the maximum value of the receiver signal. Then, a functional interrelationship between the vibration amplitude and the vibration frequency is determined, such that the vibration amplitude for the vibrating tool can be inferred from a measured vibration frequency.

A machine tool according to the invention includes the device according to the invention and is configured to determine the vibration amplitude of the vibration of the tool according to the method of the invention.

DETAILED DESCRIPTION OF THE DRAWINGS AND OF THE PREFERRED EMBODIMENTS OF THE PRESENT INVENTION

The present invention is described and explained in detail below by means of embodiments and exemplary drawings.

Figure 1:
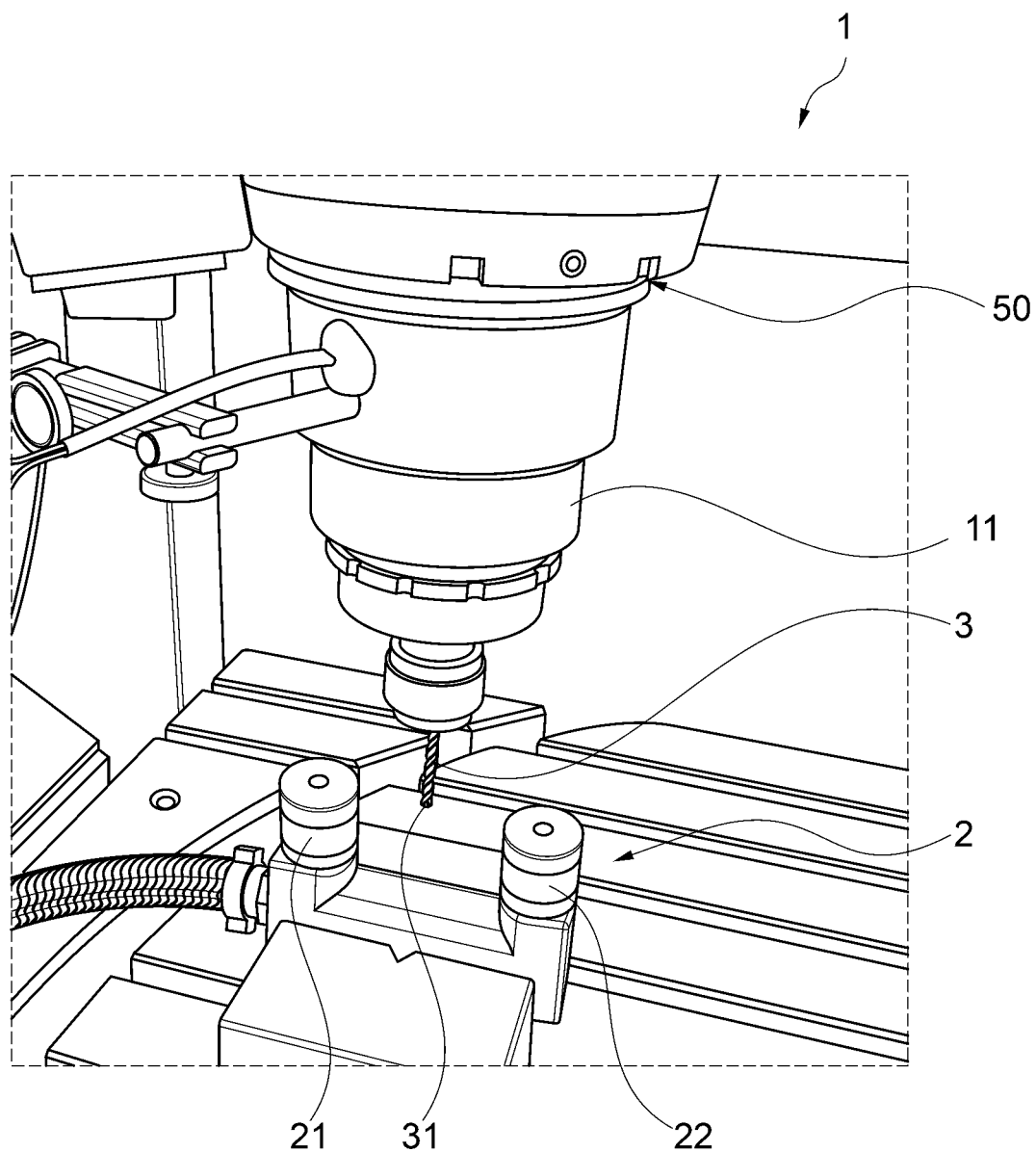
FIG. 1 shows a section of an embodiment of a device according to the invention.

FIG. 1 illustrates a section of an embodiment of a device according to the invention. This figure shows a light barrier 2, comprising a transmitter 21, which generates a light beam 23 (not shown in FIG. 1), and a receiver 22, which detects the light intensity of the light beam 23. For example, a system for the contactless tool breakage detection by RENISHAW or a BLUM laser system can be used as a light barrier 2 for tool control and breakage control, in which system a focused laser beam 23 is emitted from the transmitter 21 and the receiver 22 is configured in such a way that the laser beam 23 strikes the receiver 22. This laser light barrier 2 is mounted by means of a carrier or assembly system in the processing area of a machine tool 1 in the travel area of the axes for the tool 3. The attachment of the light barrier 2 is possible on or next to the machine table. The receiver 22 generates a receiver signal which is proportional to the detected light intensity and is outputted as an analogous voltage signal by the receiver 22.

In addition, the machine tool 1 has a spindle 50 (e.g. a tool-carrying work spindle), in which the tool 3 is received via the tool holder 11. The spindle 50 is also configured to set the tool holder 11 and the tool 3 in rotation. While the spindle 50 rotationally drives the tool 3, the vibration amplitude is measured by way of example by means of the light beam 23 emitted by the transmitter 21 and the light intensity of the light beam 23 shaded by the tool 3, said light intensity being detected by the receiver 22.

In particular, the vibration amplitude of the tool 3 is detected e.g. as follows: The tool holder 11 is positioned in such a way that the tool tip 31 of the tool 3, which is received in the tool holder 11, is disposed between the transmitter 21 and the receiver 22 in the light beam 23 of the light barrier 2 so as to shade the light beam 23. When the tool 3 is set in ultrasonic vibration, the degree of shading changes on account of the tool tip 31 vibrating in the light beam 23. This results in a modulation of the receiver signal, from which the vibration amplitude of the tool vibration can be determined.

Figure 2:
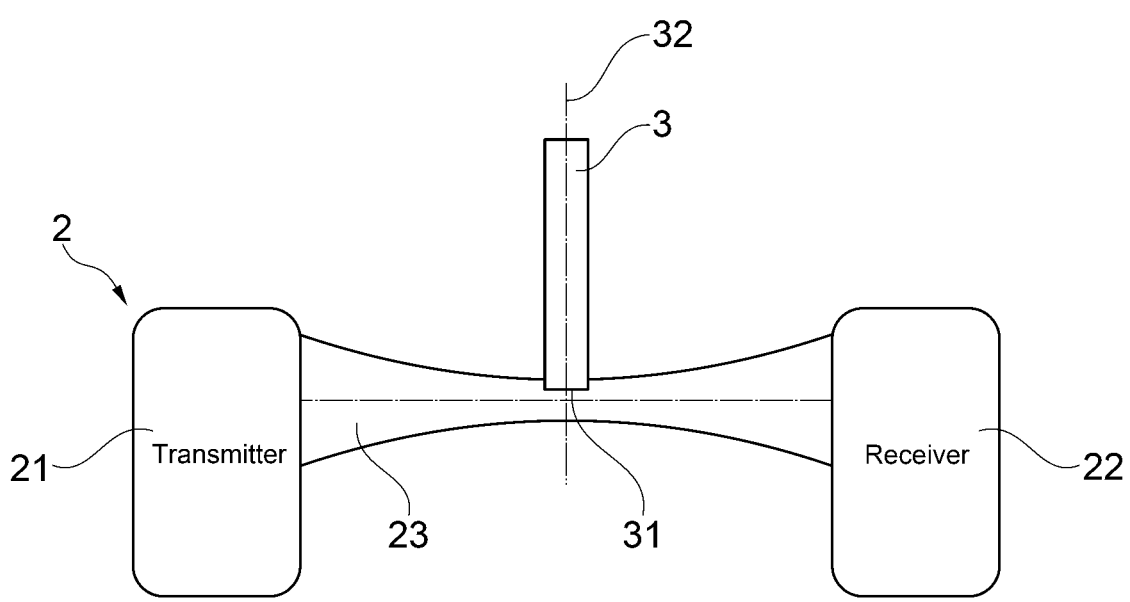
FIG. 2 shows by way of diagram a section of an embodiment of a device according to the invention.

This basic principle of the invention is explained in detail by means of FIG. 2. The system is initially calibrated. For this purpose, the tool tip 31 of the non-vibrating tool 3 is positioned close to the light beam 23 in the area of the beam waist. The diameter of the light beam 23 is the smallest at the beam waist. The tool axis 32 is aligned perpendicularly to the light beam 23. Then, the tool tip 31 is moved by means of the movable axes of the machine tool 1 in steps of e.g. 1 μm in the direction along the tool axis 32 through the light beam 23. As a result, the light beam 23 is shaded increasingly. At every step, the light intensity is measured by the receiver 22, converted into the receiver signal and the value of the voltage is associated with the current tool position. This is how a function of the tool position on the basis of the voltage is obtained. The diameter of the beam waist is here so large that a plurality of positioning steps are required to change from full light intensity to full shading and it is markedly larger than the maximum vibration amplitude to be expected of the tool tip 31.

After the calibration, the vibration amplitude can be determined as follows: The tool tip 31 is positioned in the light beam 23 approximately centrally with respect to the beam waist and with respect to the transmitter 21 and the receiver 22 and is excited to ultrasonic vibration. The vibrating tool tip 31 thus effects a modulation of the receiver signal which is proportional to the light intensity. The vibration amplitude is determined from the peak-peak value of the receiver signal by means of the previously determined function of the tool position depending on the voltage.

The calibration can also be carried out in such a way that the tool tip 31 is not displaced along the tool axis 32 but in a direction which is perpendicular to the tool axis 32 and perpendicular to the light beam 23. This calibration is used to determine the vibration amplitude of the tool vibration in the direction perpendicular to the tool axis 32.

Figure 3:
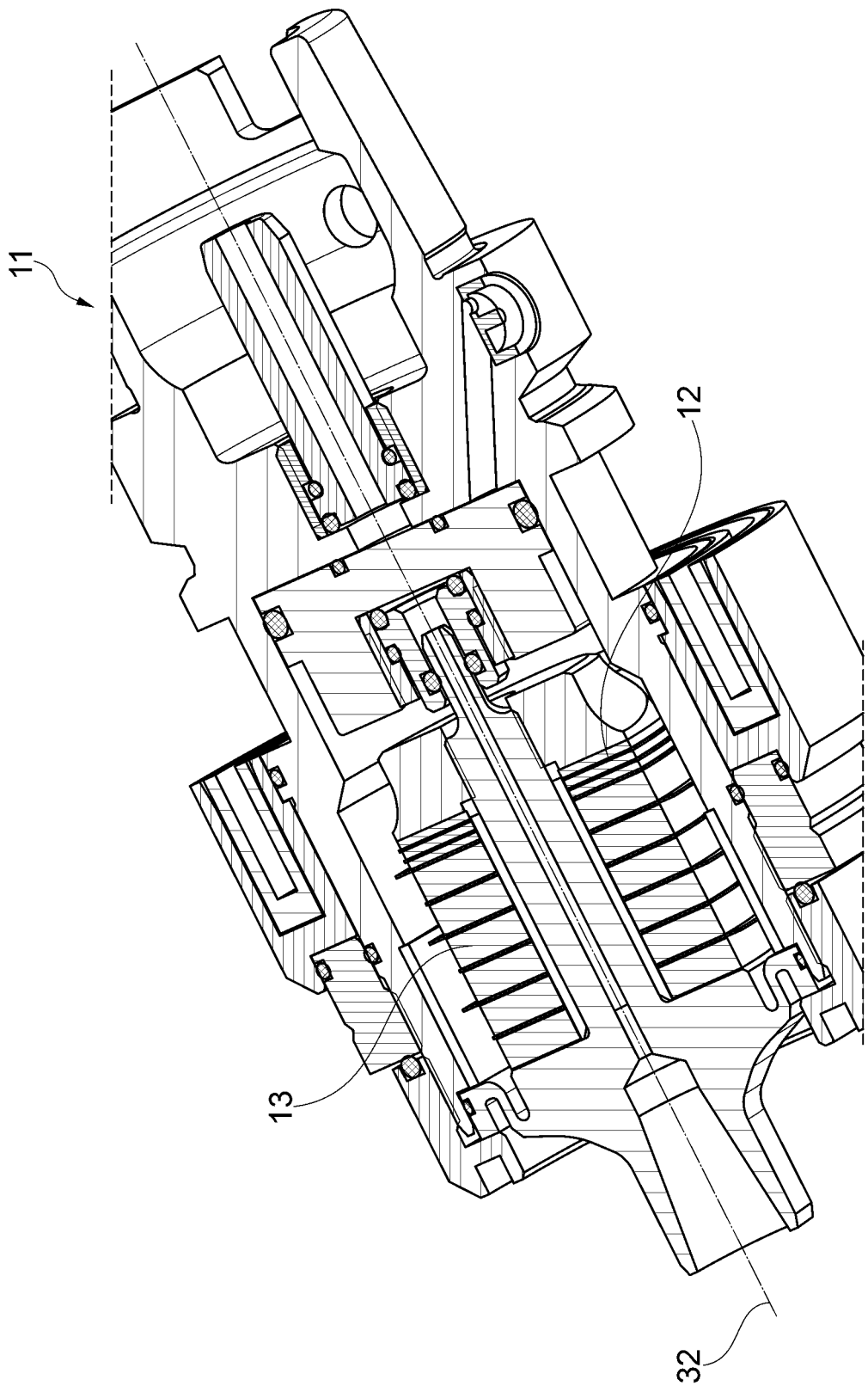
FIG. 3 shows by way of example a tool holder for use in the method according to the invention.

FIG. 3 shows by way of example a tool holder 11 for use in the method according to the invention, by means of which, after the calibration, the vibration amplitude of the tool 3 can also be measured without the light barrier 2. For this purpose, the system is calibrated as follows.

As described by means of FIG. 2, the function of the tool position is initially determined on the basis of the voltage of the receiver signal.

The tool holder 11 is equipped with a sensor apparatus 12, which generates a sensor signal from the tool vibration, said signal containing the information on the vibration frequency of the tool vibration. The sensor signal can be evaluated outside the tool holder 11 by an analysis means (not shown).

The tool 3 is then set in ultrasonic vibration. This can be carried out in such a way that a generator (not shown) excites a piezo element 13 in the tool holder 11 to mechanical vibration which is transmitted to the tool 3. The frequency of the vibration can be determined from the sensor signal generated by the sensor apparatus 12; the amplitude can be determined from the receiver signal generated by the receiver 12 of the light barrier 2.

Thereafter, the vibration frequency of the tool 3 is varied stepwise, e.g. by varying the excitation frequency of the generator. The vibration frequency and the vibration amplitude are measure at every step and the vibration frequency is associated with the respective vibration amplitude. This is how a function of the vibration amplitude is obtained on the basis of the vibration frequency. The light barrier 2 can then be removed.

The vibration amplitude of a tool 3 can be determined after such a calibration of the system without the aid of the light barrier 2. For this purpose, the tool 3 is caused to vibrate and the vibration frequency is determined from the sensor signal. The associated vibration amplitude can be determined from the previously determined function of the vibration amplitude depending on the vibration frequency.

Figure 4:
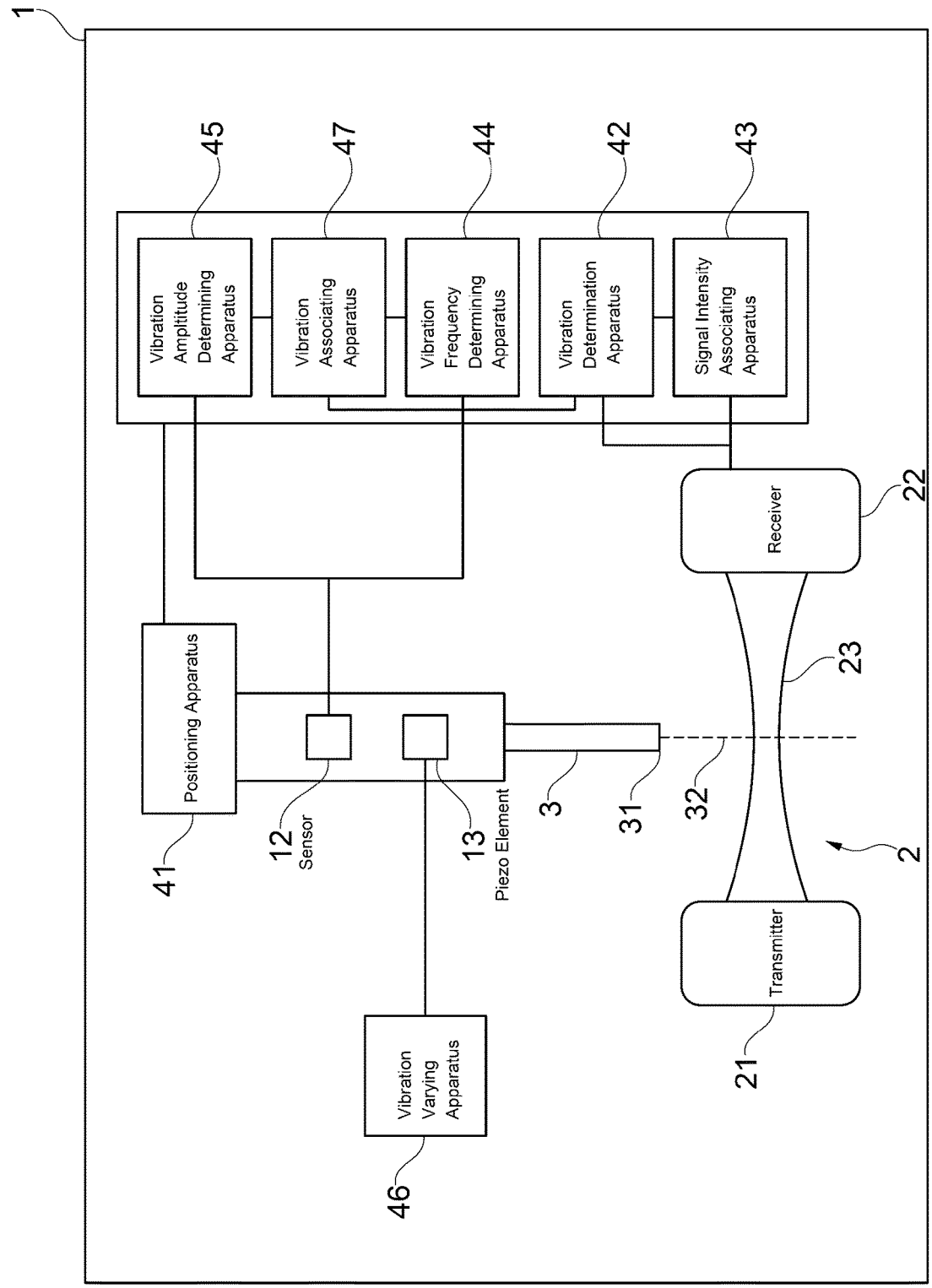
FIG. 4 shows by way of diagram an embodiment of a device according to the invention.

FIG. 4 shows by way of diagram an embodiment of a device according to the invention. The apparatus 41 for positioning the tool tip 31 can be available e.g. as movable axes which can be moved separately by the CNC control of the machine tool 1 so as to bring the tool holder 11, received at one of the axes, and the tool 3 to the desired position. The apparatus 13 for causing the tool 3 to vibrate can correspond to the piezo element 13 in FIG. 3 in the tool holder 11. The apparatus 46 for varying the vibration frequency of the tool 3 can be designed as a generator which excites the piezo element 13 to ultrasonic vibration by means of a certain excitation frequency, wherein this excitation frequency can be varied.

The apparatus 42 for determining the vibration amplitude from the receiver signal, the apparatus 43 for associating the signal intensity with the position of the tool tip, the apparatus 44 for determining the vibration frequency, the apparatus 45 for determining the vibration amplitude from the sensor signal, the apparatus 46 for varying the vibration frequency and the apparatus 47 for associating the vibration amplitude with the vibration frequency can be part of the electronic system of the machine tool 1.

The apparatus 43 for associating the signal intensity with the position of the tool tip can here be connected to the receiver 22 of the light barrier 2 to receive the receiver signal from the receiver 22. In addition, the apparatus 43 for associating the signal intensity with the position of the tool tip can transmit the calibration information to the apparatus 42 for determining the vibration amplitude from the receiver signal, which also receives a receiver signal from the receiver 22.

The apparatus 44 for determining the vibration frequency can be connected to the sensor apparatus 12 in the tool holder 11 to receive the sensor signal from the sensor apparatus 12. In addition, the apparatus 44 for determining the vibration frequency can transmit data on the vibration frequency to the apparatus 47 for associating the vibration amplitude with the vibration frequency, which, in turn, receives information on the vibration amplitude from the apparatus 42 for determining the vibration amplitude from the receiver signal.

The apparatus 47 for associating the vibration amplitude with the vibration frequency passes the calibration information to the apparatus 45 for determining the vibration amplitude from the sensor signal, which additionally receives the sensor signal from the sensor apparatus 12.

It is also possible to combine several or all the apparatuses 42 to 45 and 47 into one apparatus.

The present invention is not limited to the above described embodiments, on the contrary, the individual aspects and/or individual features of the above described embodiments can be combined to provide further embodiments of the present invention.

LIST OF REFERENCE SIGNS 1 machine tool
11 tool holder 12 sensor apparatus
13 piezo element
2 light barrier
21 transmitter
22 receiver
23 light beam
3 tool
31 tool tip
32 tool axis
41 apparatus for positioning the tool tip
42 apparatus for determining the vibration amplitude from the receiver signal
43 apparatus for associating the signal intensity with the position of the tool tip
44 apparatus for determining the vibration frequency
45 apparatus for determining the vibration amplitude from the sensor signal
46 apparatus for varying the vibration frequency
47 apparatus for associating the vibration amplitude with the vibration frequency
50 spindle

The invention claimed is:

1. A method for determining a vibration amplitude of a tool, comprising the steps of:
   generating a light beam of a light barrier with a transmitter for generating the light beam and a receiver for detecting a light intensity of the light beam;
   generating a receiver signal on the basis of a light intensity of the light beam that is detected by the receiver of the light barrier;
   positioning a tool tip of the tool in the light beam;
   causing the tool to vibrate;
   determining the vibration amplitude of the tool from a modulation of the receiver signal brought about by the vibration of the tool for calibration of a sensor apparatus;
   generating a sensor signal from the vibration of the tool arranged in a tool holder by means of the sensor apparatus arranged in the tool holder;
   determining a vibration frequency of the vibration of the tool from the sensor signal depending on the vibration amplitude of the tool; and
   determining the vibration amplitude of the tool from the sensor signal.

2. The method according to claim 1, wherein the method also includes the following step:
   causing the tool to rotate about an axis transverse or perpendicular to the light beam and/or about an axis of the tool, in particular during the step of determining the vibration amplitude of the tool from a modulation of the receiver signal and causing the tool to rotate about the axis of the tool during the step of determining the vibration amplitude of the tool from the sensor signal.

3. The method according to claim 1, wherein the tool has at least one cutting edge which protrudes from the rest of the tool in the direction of the vibration of the tool.

4. The method according to claim 3, wherein the cutting edge of the tool protrudes from the rest of the tool perpendicularly to the direction of the vibration of the tool.

5. The method according to claim 1, wherein, before the tool is caused to vibrate, the position of the tool tip in the light beam is varied in such a way that a signal intensity of the receiver signal changes depending on the position of the tool tip.

6. The method according to claim 5, wherein the position of the tool tip in an area within the light beam is varied stepwise along a direction perpendicular to the light beam, and at every step a corresponding signal intensity is associated with the receiver signal of the position of the tool tip.

7. The method according to claim 6, wherein the direction perpendicular to the light beam corresponds to a direction of a tool axis.

8. The method according to claim 6, wherein the direction perpendicular to the light beam corresponds to a direction perpendicular to a tool axis.

9. The method according to claim 1, wherein the vibration amplitude of the tool is determined from a difference of the maximum signal intensity and the minimum signal intensity of the receiver signal.

10. The method according to claim 1, wherein the receiver signal is an analog voltage signal which is produced by the receiver and is proportional to the light intensity detected by the receiver.

11. The method according to claim 1, wherein the tool is caused to vibrate in such a way that the tool tip vibrates within the light beam.

12. The method according to claim 1, wherein the vibration frequency is applied to the tool and the vibration frequency of the vibration of the tool is varied stepwise and at every step a corresponding vibration amplitude of the tool is associated with the vibration frequency.

13. A device for determining a vibration amplitude of a tool, comprising
   a light barrier having a transmitter configured to generate a light beam and a receiver configured to detect a light intensity of the light beam and to generate a receiver signal on the basis of the detected light intensity;
   a positioning apparatus configured to position a tool tip of the tool in the light beam;
   a vibration causing apparatus configured to cause the tool to vibrate; and
   a first vibration amplitude determining apparatus configured to determine the vibration amplitude of the tool from a modulation of the receiver signal brought about by the vibration of the tool for calibration of a sensor apparatus;
   a tool holder configured to receive the tool;
   wherein the sensor apparatus, arranged in the tool holder, is configured to generate a sensor signal from the vibration of the tool;
   a vibration frequency determining apparatus configured to determine a vibration frequency of the vibration of the tool from the sensor signal depending on the vibration amplitude of the tool; and
   a second vibration amplitude determining apparatus configured to determine the vibration amplitude of the tool from the sensor signal.

14. The device according to claim 13, wherein the positioning apparatus is configured to vary the position of the tool tip in the light beam in such a way that a signal intensity of the receiver signal changes depending on the position of the tool tip.

15. The device according to claim 14, comprising
   a signal intensity associating apparatus configured to associate the signal intensity of the receiver signal with the position of the tool tip, wherein
   the positioning apparatus is configured to vary the position of the tool tip in an area within the light beam stepwise along a direction perpendicular to the light beam, and the signal intensity associating apparatus is configured to associate at every step a corresponding signal intensity of the receiver signal with the position of the tool tip.
16. The device according to claim 15, wherein the direction perpendicular to the light beam corresponds to a direction of a tool axis.
17. The device according to claim 15, wherein the direction perpendicular to the light beam corresponds to a direction perpendicular to a tool axis.
18. The device according to claim 13, wherein the first vibration amplitude determination apparatus is configured to determine the vibration amplitude of the tool from a difference of the maximum signal intensity and the minimum signal intensity of the receiver signal.
19. The device according to claim 13, wherein the receiver of the light barrier is configured to generate the receiver signal as an analog voltage signal proportional to a light intensity detected by the receiver.
20. The device according to claim 13, wherein the vibration causing apparatus is configured to cause the tool to vibrate in such a way that the tool tip vibrates within the light beam.
21. The device according to claim 13, comprising a vibration varying apparatus configured to vary the vibration frequency of the vibration of the tool stepwise, and
a vibration associating apparatus configured to associate the vibration amplitude of the tool determined from the modulation of the receiver signal with the vibration frequency, wherein
the vibration associating apparatus is configured to associate, at every step, a corresponding vibration amplitude of the tool with the vibration frequency.
22. A machine tool, comprising
the device according to claim 13, wherein
the machine tool is configured to determine the vibration amplitude of the vibration of the tool in accordance with a method for determining a vibration amplitude of a tool, comprising the steps of:
generating the light beam of the light barrier with the transmitter;
generating the receiver signal on the basis of the light intensity of the light beam that is detected by the receiver;
positioning the tool tip of the tool in the light beam;
causing the tool to vibrate;
determining the vibration amplitude of the tool from the modulation of the receiver signal brought about by the vibration of the tool.

* * * * *